United States Patent
Kummamuru et al.

(10) Patent No.: US 10,896,214 B2
(45) Date of Patent: Jan. 19, 2021

(54) ARTIFICIAL INTELLIGENCE BASED-DOCUMENT PROCESSING

(71) Applicant: ACCENTURE GLOBAL SOLUTIONS LIMITED, Dublin (IE)

(72) Inventors: Krishna Kummamuru, Bangalore (IN); Swati Tata, Bangalore (IN); Guruprasad Dasappa, Bangalore (IN); Chung-Sheng Li, San Jose, CA (US); Madhura Shivaram, Bangalore (IN); Vivek Chenna, Bangalore (IN); Deepak Dalwani, New Dehli (IN); Venkata Ramakrishnap, Bangalore (IN); Mudita Shah, Bangalore (IN); Chetan N. Yadati, Bangalore (IN)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 249 days.

(21) Appl. No.: 15/995,915

(22) Filed: Jun. 1, 2018

(65) Prior Publication Data

US 2019/0370397 A1    Dec. 5, 2019

(51) Int. Cl.
*G06F 16/34* (2019.01)
*G06F 16/33* (2019.01)
(Continued)

(52) U.S. Cl.
CPC .......... *G06F 16/34* (2019.01); *G06F 16/3334* (2019.01); *G06F 16/951* (2019.01); *G06F 40/295* (2020.01); *G06N 20/00* (2019.01)

(58) Field of Classification Search
CPC .... G06F 16/34; G06F 40/295; G06F 16/3334; G06F 16/951; G06F 16/3326; G06N 20/00
(Continued)

(56) References Cited

U.S. PATENT DOCUMENTS

| 7,890,526 B1 | 2/2011 | Brewer et al. |
| 2002/0107829 A1* | 8/2002 | Sigurjonsson ...... G06F 16/9535 |

(Continued)

OTHER PUBLICATIONS

Bhatia et. al. "Query Suggestions in the Absence of Query Logs". SIGIR '11 Jul. 24-28, 2011. Beijing, China. 2011 ACM 978-1-4503-0757-4/11/07. (Year: 2011).*

(Continued)

*Primary Examiner* — Michael Pham
(74) *Attorney, Agent, or Firm* — Mannava & Kang, P.C.

(57) ABSTRACT

An AI-based data processing system analyzes a received information request to generate an interactive visualization including data responsive to the information request. The information request is processed to obtain the primary entity and one or more informational items related to the primary entity. Auxiliary entities and informational items related to the primary entity are identified and searches are executed on a knowledge base and the internet. The results from the searches are analyzed to obtain knowledge nuggets which are included into a selected one of a visualization template to generate the interactive visualization. If it is determined via user interactions with the interactive visualization that an informational gap exists between the information request and the data in the interactive visualization, the interactive visualization can be updated to address the informational gap.

20 Claims, 12 Drawing Sheets

(51) Int. Cl.
  *G06F 16/951*   (2019.01)
  *G06N 20/00*    (2019.01)
  *G06F 40/295*   (2020.01)

(58) Field of Classification Search
  USPC ........................................................ 707/722
  See application file for complete search history.

(56) References Cited

U.S. PATENT DOCUMENTS

| | | |
|---|---|---|
| 2006/0190436 A1 | 8/2006 | Richardson et al. |
| 2011/0125764 A1 | 5/2011 | Carmel et al. |
| 2013/0144605 A1* | 6/2013 | Brager .................... G06F 16/30 |
| | | 704/9 |
| 2015/0081277 A1* | 3/2015 | Behi ...................... G06F 40/205 |
| | | 704/9 |
| 2019/0005012 A1* | 1/2019 | Priestas .................. G06F 40/30 |
| 2019/0222540 A1* | 7/2019 | Relangi ................. G06Q 30/01 |

OTHER PUBLICATIONS

EP3575984 european search opinion dated May 9, 2019 (Year: 2019).*

* cited by examiner

US 10,896,214 B2

ARTIFICIAL INTELLIGENCE BASED-DOCUMENT PROCESSING

BACKGROUND

The universal use of digital computers in almost every walk of life has led to generation of immense volumes of data. As a result, complex database management systems are developed to store and retrieve information when requested by users. In addition to maintaining and retrieving information, a database needs to be able to allow users to share the retrieved information. Generally, users may require aggregated data that conveys the most relevant information for their decision making. Accordingly, many enterprise database systems include tools such as report generators, to produce summary documents that collate data from various databases and present it in a coherent manner as reports that help users to analyze and understand complex data.

Information regarding a subject can be presented in a document in an organized manner through creative use of tables, infographics, images or combinations thereof. Informative documents such as reports may include text, images, numeric or alpha-numeric data. Informative documents or reports can obtain their data from various sources such as flat files, comma separated values (CSV) files, spread sheets, databases and the like. Reports are extensively used for summarizing or identifying and displaying trends derived from the data and or answer specific questions related to one or more entities whose data may be recorded in the databases.

BRIEF DESCRIPTION OF DRAWINGS

Features of the present disclosure are illustrated by way of examples shown in the following figures. In the following figures, like numerals indicate like elements, in which.

DETAILED DESCRIPTION

Figure 1:
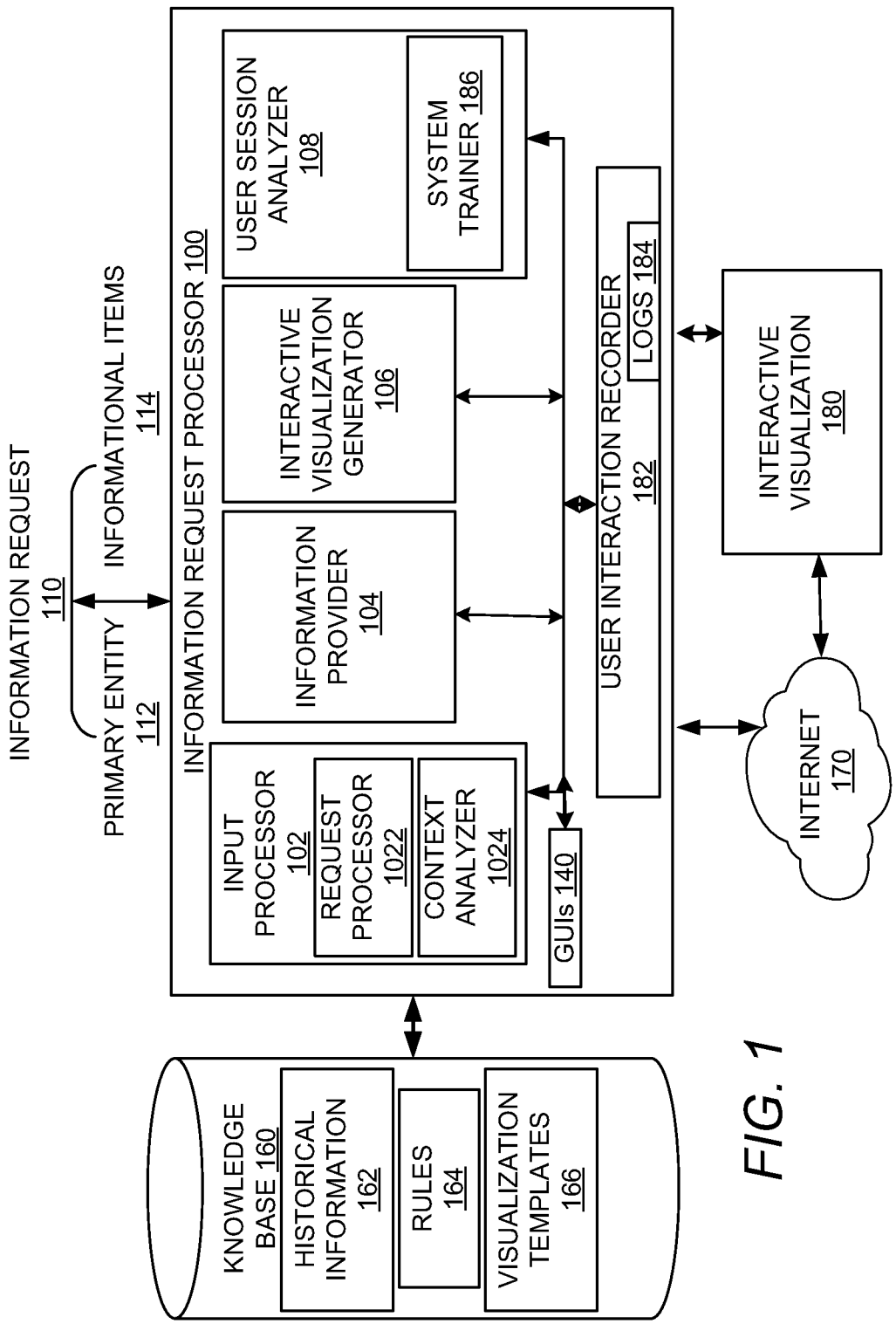
FIG. 1 is a block diagram of an AI-based document processing system in accordance with examples disclosed herein.

For simplicity and illustrative purposes, the present disclosure is described by referring to examples thereof. In the following description, numerous specific details are set forth in order to provide a thorough understanding of the present disclosure. It will be readily apparent however that the present disclosure may be practiced without limitation to these specific details. In other instances, some methods and structures have not been described in detail so as not to unnecessarily obscure the present disclosure. Throughout the present disclosure, the terms "a" and "an" are intended to denote at least one of a particular element. As used herein, the term "includes" means includes but not limited to, the term "including" means including but not limited to. The term "based on" means based at least in part on.

According to one or more examples described herein, an artificial intelligence (AI)-based data processing system is disclosed. The data processing system receives an information request including one or more primary entities and one or more informational items related to the primary entities. The primary entities constitute a subject of the information request while the information items can form attributes of the primary entities. The data processing system employs machine learning (ML) models to identify other related search terms for the primary entities from a knowledge base. In an example, the ML models can be used in conjunction with other techniques such as N-grams wherein similarities of the words before and after the primary entities are obtained for deriving contexts associated with the primary entities thereby identifying the other related search terms more accurately. The search terms can be ranked based on the similarities and highest ranked terms can be selected for searching and/or framing the queries. The knowledge base forms the data backbone of the data processing system. Diverse information including historical information, rules pertaining to searches, visualization templates and the like can be stored within the knowledge base in the form of knowledge graphs that include nodes and edges.

Various queries can be framed using the primary entities, the informational items and the other related search terms. The queries are used to execute searches of the knowledge base and the internet. The results obtained from the searches are evaluated and the relevant documents are processed to extract datasets which correspond to knowledge nuggets to be included within an interactive visualization. The datasets can be further processed based on the data formats via parsing and tokenizing for insertion into one or more selected visualization templates. The visualization templates can include webpages or a navigable website composed of markup languages, Java Script and the like. Data models corresponding to the different data sets within the knowledge nuggets are used to select appropriate visualization templates using for example, AI elements like classifiers. More than one visualization template can be selected and ranked so that the most optimal visualization template for a combination of the datasets within the knowledge nuggets is selected.

The interactive visualization is synthesized from the selected visualization template. The interactive visualization includes at least the knowledge nuggets and one or more interactions points which encourage user interaction with the interactive visualization thereby enabling the data processing system to determine if the user is satisfied with the interactive visualization. The interaction points enable the user to convey a further informational need to the data processing system thereby enabling the data processing system to address such an informational need either within the same session or at later time. For example, when the user interacts with one of the interactions points, it can fire an implicit query which will be used to execute a further search of the knowledge base and the internet to retrieve results responsive to the implicit query. The results thus retrieved can be processed in a manner similar to the information request so that a visualization template suitable to the results is retrieved and used to synthesize a further interactive visualization that answers the user's informational need.

The implicit query thus fired, the results obtained and the information request with the primary entity and informational items are all recorded as inter-related elements within the knowledge base. In an example, the data processing system can be configured to learn from the process of determining the further informational need. When a query similar to the information request is received, the implicit query can also be automatically used to retrieve results as it is associated with the information request within the knowledge base. Therefore, the data processing system is configured to automatically improve with each usage so that new linkages are learnt and newer results are constantly associated with queries that were previously executed so that fresh results are provided even for prior queries. The information request processor as disclosed herein enables machines to intelligently identify relevant search queries and/or information sources for a given information request and to generate interactive visualizations based on execution of the search queries on the information sources. Typically, static reports including details regarding entities such as suppliers or other requirements can fail to address the user's informational need if the information request is not understood accurately by a programmer generating the report. However, the user's information need is not immediately satisfied. Rather, the user has to wait to confer with the programmer to correctly convey the informational need to have an accurate report generated. Also, static reports do not allow the user to see beyond the information currently displayed in the report. On the other hand interactive data presentations as detailed herein enable gathering the user's informational need even as the user is viewing the interactive visualization. If possible, the user's informational need is satisfied within the same web session during which the user views the interactive visualization.

The data processing system as described herein represents a technical improvement in that the visualizations for the various data sets are automatically generated based on processor instructions without the need for human intervention. Initially, the search results are obtained from multiple sources including private sources such as the historical information within the knowledge base and the public sources on the internet. As a result, the data processing system is enabled to make use of prior queries and results from the historical information while simultaneously gathering the later available results from the internet. Also, the dataset models enable selecting one or more of the various dataset visualizations for inclusion into the visualization template without the need for human intervention. The dynamic interactive visualization thus developed is not only the optimal presentation of data but is also configured to identify and address the user's informational need. The data processing system therefore enables faster and more accurate execution of the visualization generation procedures.

FIG. 1 is a block diagram of an AI-based document processing system 100 in accordance with examples disclosed herein. The data processing system 100 analyzes a received information request 110 to identify at least one primary entity 112 and one or more informational items 114 from the information request 110 and generates an interactive report or an interactive visualization 180 addressing the informational need expressed in the information request 110. Based on a user's interaction with the interactive visualization 180, the data processing system 100 can determine if the user is satisfied with the information in the interactive visualization 180 or if a gap exists between the user's informational need and the information presented in the interactive visualization 180. The user's satisfaction level with the interactive visualization 180 can be determined from user interaction logs 184 obtained by recording the user's interactions with the interactive visualization 180. It can be appreciated that the user's information requirement need not have been expressed in the information request 110 that was originally received. Rather, the user may have developed a need for additional information while viewing the interactive visualization 180. In either case, the interactive visualization 180 can be dynamic in that the informational gap is addressed by retrieving and conveying information responsive to the user's informational need. In an example, the interactive visualization 180 can be reconfigured or changed to address the user's informational need in a single interaction session or in real-time. In an example, the user may be required to log in at a later stage in order to view the required information.

The information request 110 can be received at the data processing system 100 via different modalities such as but not limited to, an email, a small message service (SMS), a voice or text message via a messaging app, via one of the GUIs 140 put forth by the data processing system 100 and the like. The received message is processed by a request processor 1022 included in the input processor 102. The request processor 1022 uses Natural Language Processing (NLP) techniques such as but not limited to named entity recognition (NER) and the like to identify the primary entity 112 and the informational items 114 from the information request 110. For example, the received information request 110 can be parsed and processed for stop word removal, stemming, parts of speech (POS) tagging and the like to by the request processor 1022 to generate word tokens from which the primary entity 112 and the informational items 114 can be identified via the NER. In an example, the primary entity 112 can also be identified via simpler mechanisms such as table comparisons wherein a database table or other data source includes a list of entities one of which can match the primary entity 112.

The primary entity 112 can be the subject of the information request 110 while the informational items 114 can include particular items of information regarding the subject that are being requested. For example, if the information request 110 relates to the alternate suppliers who can provide the same items or services of a particular supplier, the primary entity 112 may be identified by the name of the supplier and the informational items 114 may include the terms "rivals" or other equivalent phrases such as "competitors" and the like. In an example, the information request 110 can include more than one primary entity. For instance, the user can be comparing the quarterly results of two organizations, in which case, the analysis of the information request 110 by the request processor 1022 can result in extraction of two primary entities—namely the two organizations being compared.

Furthermore, the input processor 102 can include a context analyzer 1024 which can employ n-gram analysis in combination with other techniques such as but not limited to POS tagging to determine a context associated with the primary entity 112 and the informational items 114 within the information request 110. The context analyzer 1024 can also employ AI techniques such as trained machine learning (ML) models to identify synonyms or other related search terms that can be employed for obtaining information related to the primary entity 112 and the informational items 114. In another example, past user behavior such as word substitutions and the like obtained from historical information 162 stored within a knowledge base 160 can be employed to identify the other related search terms. The similarity scores of the other related search terms can be estimated via various methodologies such as but not limited to, cosine similarity. Based at least on similarity scores, the other related search terms can be also be employed to obtain information relevant to the information request 110. Besides similarity scores, other criteria such as a source of a particular piece of information can be used to rank the other related search terms to enable selection of the other related search terms for retrieving the relevant information. The input processor 102 can further employ lexical databases such as WordNet which are usually employed for text analysis in NLP applications.

The knowledge base 160 is configured to store enormous data that is pertinent to the operation of the data processing system 100. The data in the knowledge base 160 can be modeled, for example, as knowledge graphs for automatic access by the results generation and/or visualization generation processes of the data processing system 100. The knowledge graphs can include as nodes, the various semantic concepts such as the entities and auxiliary entities retrieved by the input processor 102, the information regarding the entities such as attributes, documents such as prior reports, requirements documents, documents with pertinent information and the like. The relationships between the various nodes based on semantics can be represented as the edges of the knowledge graphs with each edge being defined by one or more attributes. The knowledge base 160 can be constantly updated as new information requests are received, newer entities, attributes and other informational items are identified by the input processor 102. Various algorithms and heuristics can be employed for knowledge extraction with the knowledge base 160. These can include simple heuristic approaches such as text processing based on trained IE models which can include regular expressions and NLP techniques. Other knowledge extraction methodologies such as deep learning techniques can also be employed to obtain the required data from the knowledge base 160. In an example, the documents from the internet 170 can be downloaded or indexed within the knowledge base 160 and further processed for their relevancies to the information request 110. In an example the rules 164 can be included in the knowledge base 160 so that the entities involved in the rules are modeled as nodes and the conditional relationships or the rules 164 defining the relationships between the entities (or entity attributes) are modeled as edges with defined attributes.

The rules 164 could limit web-sites that should or should not be included, in the knowledge base 160. For example, the rules 164 can be used to filter web-sites which include fake news articles or irrelevant websites having the same terms as search criteria. When using a general purpose search engine with internet searches such unwanted results/websites may show up at the top of the search results on. Hence, retrieving the search results from the knowledge base 160 using the rules as opposed to the internet can provide a first level filter as the knowledge base 160 would already have some information regarding the search context. The rules 164 can be more complex or granular so that the rules 164 could enable selection of entities or phrases. For example, there can be words or phrases which refer to supplier names as well as names of people. The rules 164 enable selection of one of the supplier's name or a person's name. There could also be words or phrases that are general words and do not make sense in a context or vice-versa. The rules 164 provide for search contexts that enable selection of particular words and/or phrases.

The primary entity 112, the informational items 114 and the other related search terms can be employed by an information provider 104 to search for and gather information relevant to the information request 110. The information provider 104 can be configured to search for the required information in a plurality of data sources including private data collections such as the knowledge base 160 and public resources on the internet 170. The historical information 162 which is part of the knowledge base 160 can include prior reports and proxy logs that record activities leading to the generation of the prior reports. Proxy servers can also log the various client device interactions with the prior reports/interactive visualizations which can be helpful for trouble shooting. Accordingly, when a user is generating an informational document such as a report in response to an information request, the various data sources accessed by the user, the search queries executed by the user and the search terms employed by the user and the results received by the user in response to the search queries are recorded in the proxy server logs. The proxy server logs can include a collection of such logs from a plurality of proxy servers employed by many users who may be generating such reports. In addition, the data processing system 100 can be configured to search the internet 170 using one or more of the primary entity 112, the informational items 114 and selected ones of the other related search terms 116 as search queries. The information provider 104 crawls web search engines such as but not limited to GOOGLE, BING and the like that are currently available for conducting the search.

Documents containing information relevant to the information request 110 are retrieved from one or more of the knowledge base 160 and from public data resources on the internet 170. The information provider 104 downloads or otherwise accesses the relevant documents and extracts information from the relevant documents in accordance with NLP techniques discussed herein. In an example, a Python-based search engine library such as Whoosh can be employed for identifying the relevant documents. Whoosh API facilitate indexing free-form or structured text and enable quickly find matching documents based on simple or complex search criteria. The information provider 104 additionally employs information extraction models for obtaining the information responsive to the information request 110.

An interactive visualization generator 106 synthesizes an interactive visualization 180 based on the information which is to be presented to users. The knowledge base 160 can include a collection of visualization templates 166 which can be used for displaying the information obtained by the information provider 104. One or more of the visualizations can be selected based on factors such as but not limited to, the nature of information to be presented, the domain associated with the information request 110, a user's preferences (if available) including customized settings and the interaction points to be included in the visualization. In an example, more than one visualization can be selected and ranked in accordance with various criteria. A most popular visualization which is a preferred data representation for the given data format for the majority of users of the data processing system 100 or a user's preferred visualization for the given data format can be initially displayed with options to display the other selected, lesser ranked visualizations. Based on the user interactions and the determined satisfaction level other visualizations can be presented.

The interactive visualization 180 including the information gathered by the information provider 104 from the knowledge base 160 and the internet 170 can thus be synthesized for example, as a navigable website which can include one or more webpages. The webpages can include links to other visualizations for the presented information. In addition, a user interaction recorder 182 records user interactions with the interactive visualization. The recorded user interactions can include the various ways in which a user can interact with a webpage such as but not limited to, clicks, scrolls, hovering with a pointer, selecting, copying, downloading, printing, sharing the interactive visualization with other users, having a portion of the interactive visualization 180 on active display for a longer than average time and the like. In an example, the user interaction recorder 182 can be a tool that allows you to see how and where users are moving their cursors. Furthermore, the user interaction recorder 182 permits analysis of individual web sessions to segment out the interactive visualizations and within a given interactive visualization, areas of the interactive visualization 180 that are receiving high/low/medium interactions. The interactive visualization 180 thus configured is provided to one or more users, for example, as a link which is transmitted via email, SMS, text message and the like. Although the user interaction recorder 182 is shown as included in the data processing system 100, it can be appreciated that the user interaction recorder 182 or portions thereof can also be included in the interactive visualization 180 access by the user.

When accessed by a user, the user interaction recorder 182 can record the various user interactions with the interactive visualization 180 thereby providing the data processing system 100 with logs 184 of the user interactions or recordings of the user sessions with the interactive visualization 180. In an example, the data processing system 100 can include a user session analyzer 108 which receives the logs 184, parses the logs and identifies particular user interactions for example, via text matching techniques. In an example, certain keywords can be mapped to specific user intents within the user session analyzer 108. Based on the particular user interactions, the user session analyzer 108 can be configured to determine the user's satisfaction with the interactive visualization 180 in accordance with methodologies detailed herein. If the user session analyzer 108 determines that the user is not satisfied with the interactive visualization 180, the interactive visualization 180 can be altered with additional information being requested implicitly or explicitly by the user in accordance with methodologies detailed herein.

The user session analyzer 108 can also include a system trainer 186 that enables automatic learning within the data processing system 100 whenever feedback is received either explicitly or implicitly from the user. For example, when a user provides explicit feedback including a satisfaction level for the interactive visualization 180 or a new information request, then such data can be used to train the data processing system 100. Similarly, when user request is received implicitly via the user's interactions, such feedback can also be employed to train the data processing system 100.

Figure 2:
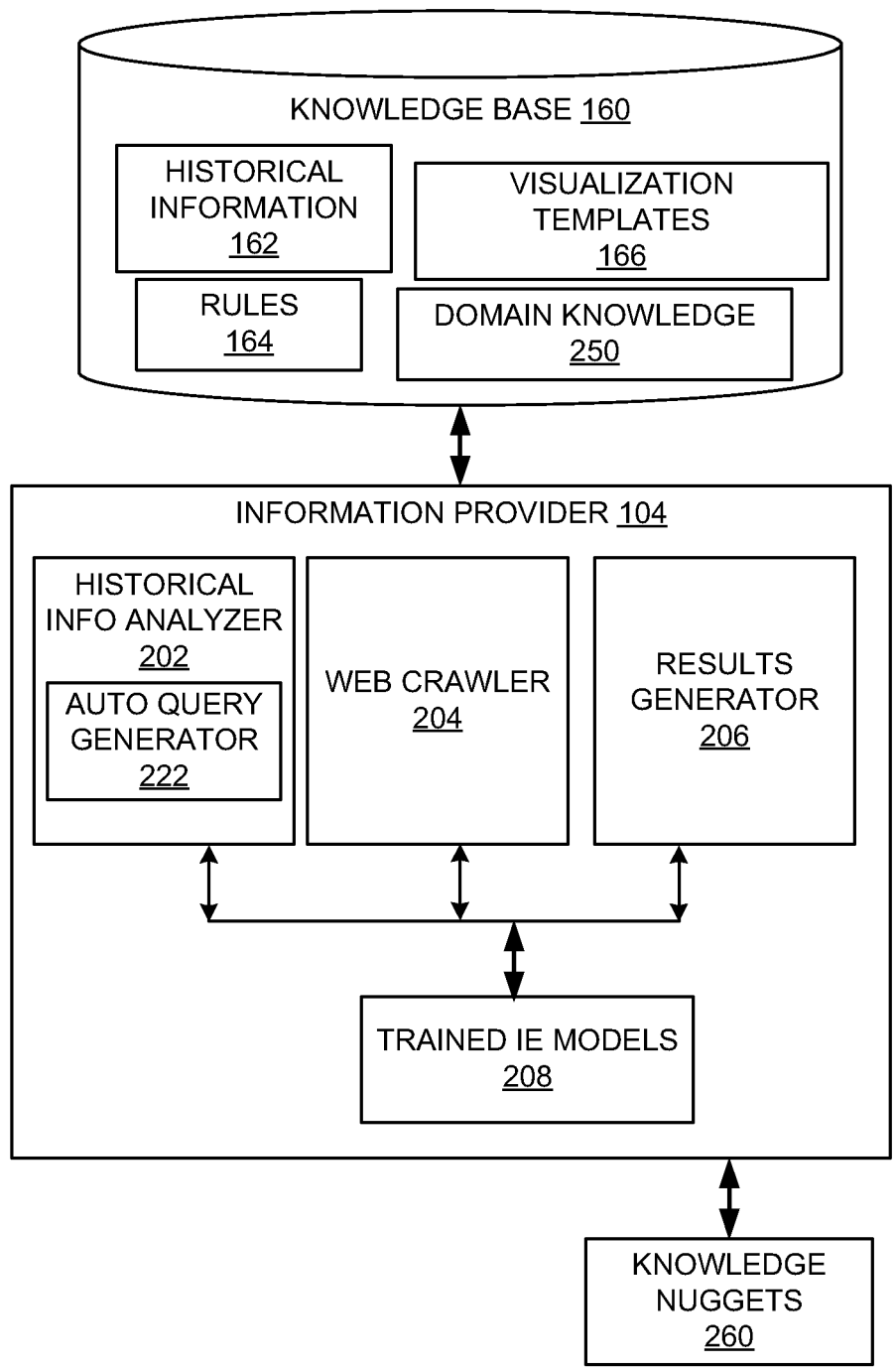
FIG. 2 shows a block diagram of an information provider in accordance with examples disclosed herein.

FIG. 2 shows a block diagram of the information provider 104 in accordance with examples disclosed herein. The information provider 104 includes a historical info analyzer 202, a web crawler 204, a results generator 206 and trained IE models 208. The historical info analyzer 202 accesses the historical information 162 available to the data processing system 100 via the knowledge base 160 and public data resources available via the internet 170 to retrieve documents having information that is pertinent to the information request 110. As mentioned above, the input processor 102 analyzes the information request 110 to not only extract the primary entity 112 and the information items 114 but also obtains additional entities, entity attributes and informational items via searching for related terms, ranking the related terms and selecting one or more of the related terms to extract the information relevant to the information request 110.

The historical info analyzer 202 can include an auto query generator 222 that can automatically generate queries using the data extracted by the input processor 102 to search for the relevant information for the information request 110 as detailed further herein. The historical info analyzer 202 accesses the historical information 162 to retrieve the relevant information for the information request 110. The historical information 162 can include but is not limited to, prior documents including interactive visualizations, static reports, activity logs such as proxy server logs of users who generated the reports and visualizations and the like. The proxy server logs can include additional resources such as the queries and the data sources employed by the users in the generation of the prior reports and/or interactive documents, the results that were obtained and the like. In an example, one or more entity queries can be framed for execution on the knowledge base and the internet using the primary entities 112 as search terms for the queries. Candidate search terms can be obtained from the results obtained on executing the entity queries on the knowledge base 160 and the internet 170, wherein the results that match part-of-speech tagging of the primary entities are selected as the candidate search terms. The search terms can be further filtered from the candidate search terms based on a match between the primary entities 112 and the candidate search terms.

The knowledge base 160 can additionally include domain knowledge 250. The domain knowledge 250 may contain for example, structure of a report or an interactive visualization including the sections and sub-sections. For example, information requests for a domain may typically involve similar kind of information for various entities associated with the domain. Therefore, the interactive visualizations generated for the domain may follow a standardized structure whereas the structures for reports from different domains may differ. Furthermore, the domain knowledge 250 may include parameters that are to be determined for an entity associated with the domain. For example, the geo of operations for an entity in the logistics domain may carry higher weight when compared to an entity in the domain of cloud service providers. In the latter case, the geo of operations carries lesser weight while the physical location of the cloud servers may carry higher weight. In an example, the prior interactive visualizations within the historical information 162 can be categorized into domains, based on the type of organizations or industries the primary entities of those prior reports are associated with. For example, a report regarding a primary entity in hardware manufacturing may be associated with a broader 'computer industry' domain or a more focused 'hardware manufacturer' domain. Similarly an interactive visualization on a charitable institution may be categorized as 'non-profit' domain.

The historical info analyzer 202 can be configured to analyze the proxy logs and the prior reports to identify successful search queries that produced the relevant information for the respective prior reports. Textual analysis and comparisons of entities, attributes, date/time stamps etc. identified from the proxy logs when mapped to similar elements of the prior reports can enable identifying the search queries and information sources that enabled the generation of the prior reports. In an example, the queries and/or data sources that were previously employed for prior reports can also be employed for generating information responsive to the information request 110. Hence, the queries and/or data sources can be reused to generate the data for satisfying the information request. For example, by employing trained IE models 208, it may be determined that data from two of the prior reports is sufficient for addressing the information request 110.

In case the existing queries and/or information from the knowledge base 160 is inadequate to address the information request 110, new queries can be generated and executed on the internet 170 to obtained data responsive to the information request 110. The auto query generator 222 can substitute entities, attributes and other informational items from the prior successful queries with the data from the input processor 102 to auto-generate new queries which can be employed to obtain the relevant information for the information request 110. One or more of NLP techniques such as but not limited to, POS tagging, sub-string matching, string substitution can be used to generate new queries with the data from the input processor 102. In an example, the entities, entity attributes, related entities and other informational items together with the successful queries can be presented to a user who can then handcraft newer queries to be used for addressing the information request 110.

The new queries from the historical info analyzer 202 (whether auto generated or manually crafted) are obtained by the web crawler 204 which then employs the new queries to search the internet 170. The documents which are retrieved are analyzed by the results generator 206 using the trained IE models 208 and the rules 164 from the knowledge base 160 to obtain knowledge nuggets 260 or chunks of information responsive to the question(s) posed by the information request 110. Trained IE models 208 can also be employed to extract various entities and entity attributes from various sources including internet search results and from the historical information 162. Non-limiting examples of data extracted using the IE models 208 can include names, contact information, locations, attributes such as financial information about an organization, staff strength, ratings, competitors of the organization, social media content or activity and the like. In addition, an NLP data source can also be coupled to the data processing system 100 that enables identification of synonyms, acronyms and the like. For example, for 'headquarters' a synonym like 'main office' may be identified or a synonym like 'major players' can be identified for 'competitors'. The relevant data gathered from the internet 170 can be added as data sets associated with the knowledge nuggets 260. Each of the knowledge nuggets 260 can be stored in the knowledge base 160 as name-value pairs.

Figure 3:
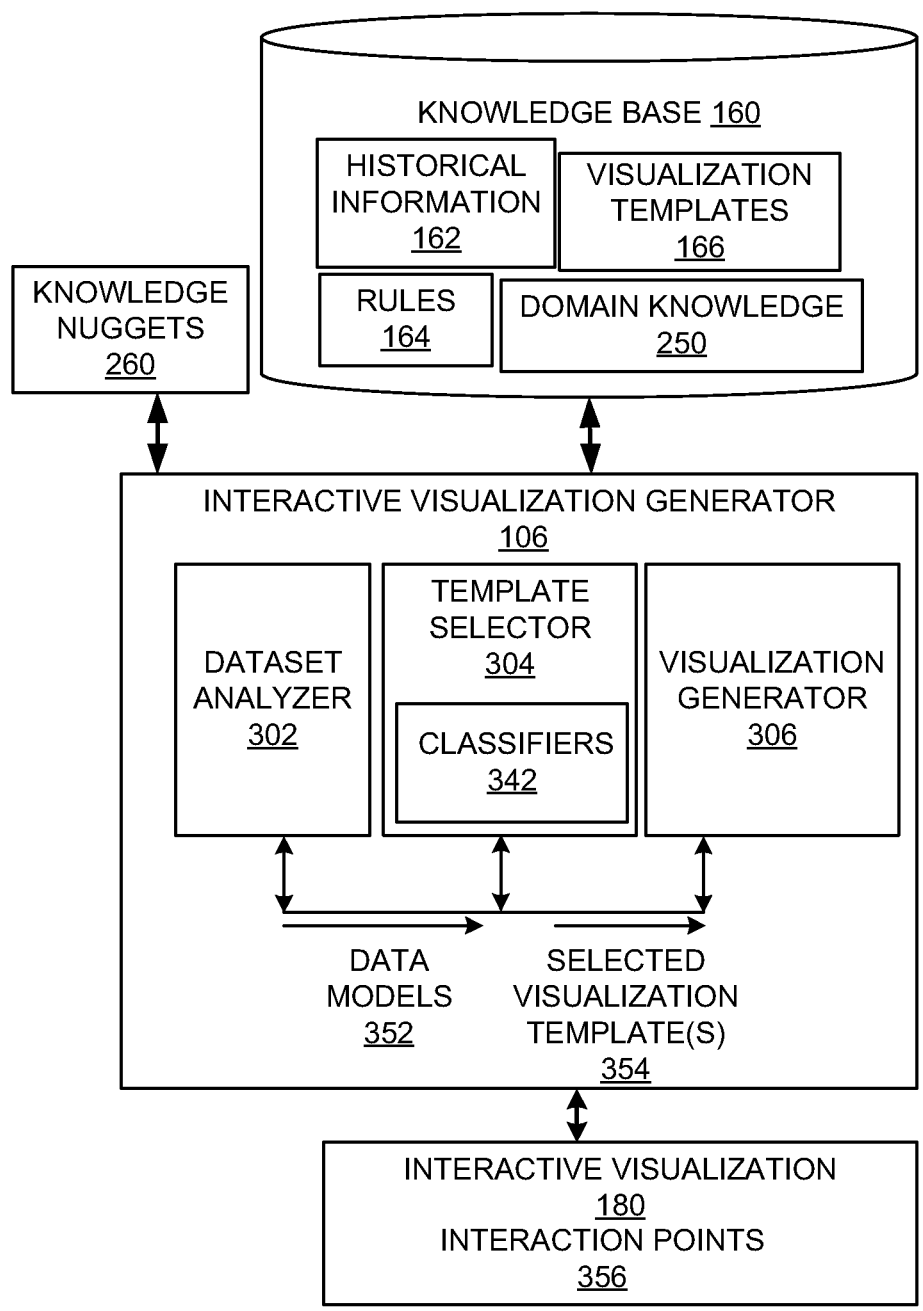
FIG. 3 is a block diagram of an interactive visualization generator in accordance with examples disclosed herein.

FIG. 3 is a block diagram of the interactive visual generator 106 in accordance with examples disclosed herein. The knowledge nuggets 260 extracted from the various sources can include data of various data types in different formats ranging from a single character to a complex set of n-dimensional data values or even copious amount of textual data. The interactive visualization generator 106 can determine a format of the knowledge nuggets 260 and select an optimal visualization for the data set from the collection of visualization templates 166 thereby generating the interactive visualization 180. The interactive visualization 180 can include, in an example, one or more webpages created in Hypertext Markup Language (HTML), Cascading Style Sheets (CSS), Java script etc. The webpages can include data elements pertaining to textual, image, sound and video files. Based on the analysis of the data or information to be conveyed in the interactive visualization 180, one or more of the data elements can be included along with interaction points 356. The interaction points 356 are specific areas or points on the webpages which enable or encourage user interaction with the webpage thereby enabling the data processing system 100 to determine the satisfaction level.

A dataset analyzer 302 included within the interactive visual generator 106 analyzes the datasets in the knowledge nuggets 260 to identify features of the dataset thereby selecting data models 352 which are representative of the datasets. In an example, the datasets can include key-value pairs and the dataset analyzer 302 analyzes each of the key-value pairs to obtain features the datasets in the knowledge nuggets 260. The knowledge nuggets 260 can therefore include a collection of datasets wherein each dataset corresponds to a particular visual and/or non-visual element of the interactive visualization 180. For example, if the elements to be included in the interactive visualization 180 include an image/logo, a table of values, one or more links to additional presentations of the tabular values in different formats or other information regarding entities included in the interactive visualization then the knowledge nuggets 260 can include datasets corresponding to each of the elements to be included in an interactive visualization 180.

Accordingly, the datasets can include one or more of textual, numeric, alpha-numeric, and image data. The dataset analyzer 302 can be correspondingly configured to identify characteristics of the datasets such as but not limited to, the various data formats including machine-readable data, data tagged with markup, the type of data such as numeric, string, alpha-numeric and the like. Further characteristics can include the depth of nesting, the number of pairs and the like. The data models 352 corresponding to the datasets within the knowledge nuggets 260 are accessed by the template selector 304 for selecting an optimal template for presenting the knowledge nuggets 260. The data models 352 are more like the representations of the data sets. For example, if an AI task involves classification of a data set, then the data models 352 (or the task of data modelling), help to extract the features required by the classification algorithm and generate a model which can be used later for classification for unknown datasets. In an example, the optimal template can be configured to display a single word or a single sentence conveying the data responsive to the information request 110. In an example, the optimal template may need to be able to accommodate complex tabular form of multi-dimensional data, logos, text with further links to other presentations, and the like. Based on the presentation formats selected for the various knowledge nuggets 260, an optimal template that arranges the knowledge nuggets 260 within a display can be automatically selected by visualization classifiers 342. The visualization classifiers 342 can select one or more visualization templates for the presentation of the knowledge nuggets 260 based on the data models 352. Supervised training techniques using training data including data models and corresponding optimal templates for the data models can be used for training the visualization classifiers 342 in the selection of the visualization templates 166.

In the case of a multidimensional data, presentation formats can include animated and static images such as but not limited to, different types of bar-graphs (such as with tooltips or multi-scale bar charts), line graphs, pie diagrams, Venn diagrams, bubble charts, heatmaps, calendar views, treemaps, Voronoi diagrams, maps, circular heat charts, radial progress, Corona Radar, and the like. The selected visualization templates can be ranked and the top ranked visualization template can be the optimal template used for generating the interactive visualization 180. A subset of other visualization templates (e.g., top N ranked—N being a natural number) can also be used for generating the visualization templates based on the user request. The availability regarding other visualization templates for additional visualizations can be conveyed to the user via one or more of messages, links or other modalities.

The visualization generator 306 receives the selected visualization template 354 for the knowledge nuggets 260 so that the knowledge nuggets 260 are arranged within designation portions of the selected visualization template. The visualization generator 306 further includes interaction points 356 to be located at different points within the selected visualization template(s) 354. The interaction points 356 can be associated with one or more of the user interface (UI) elements or data elements within the interactive visualization 180. The interaction points 356 can include one or more of widgets such as but not limited to, links, UI elements such as scrollbars, buttons, portions of the interactive visualization 180 wherein movement of a mouse pointer fires specific events, toolbar buttons including buttons for printing, downloading, sharing, scroll bars, zooming in and out (if relevant) and the like. The selected visualization template 354 along with the knowledge nuggets 260 and the interaction points 356 are used for generating the interactive visualization 180. In some example, user(s) preferences can be taken into account when generating the interactive visualization 180. For example, corporate logos and colors can be prebaked into the selected templates for a uniform look and feel. In addition or alternatively individual user preferences can also be accounted for when producing the interactive visualizations. In some examples, the interactive visualization 180 can also include provisions for users to provide explicit feedback regarding additional informational needs. The interactive visualization 180 can also provide access to the additional visualizations that can be generated from lesser ranked visualization templates. For example, user-selectable links to the additional visualizations can be included in the interactive visualization 180.

When accessed by a user, the user interaction recorder 182 can record the various user interactions with the interactive visualization 180 thereby providing the data processing system 100 with logs 184 of the user interactions or recordings of the user sessions with the interactive visualization 180. In an example, the data processing system 100 can include a user session analyzer 108 which receives the logs 184, parses the logs 184 and identifies particular user interactions for example, via text matching techniques. Based on the particular user interactions, the user session analyzer 108 can be configured to determine the user's satisfaction with the interactive visualization 180 in accordance with methodologies detailed herein. If the user session analyzer 108 determines that the user is not satisfied with the interactive visualization 180, the interactive visualization 180 can be altered with additional information being requested implicitly or explicitly by the user in accordance with methodologies detailed herein.

Figure 4:
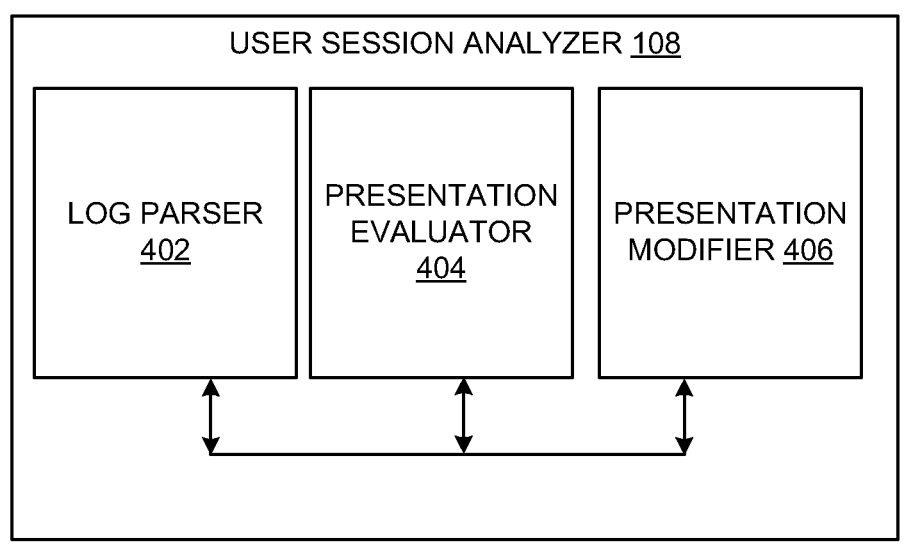
FIG. 4 shows a block diagram of a user session analyzer in accordance with examples disclosed herein.

FIG. 4 shows a block diagram of the user session analyzer 108 in accordance with examples disclosed herein. The user session analyzer 108 receives logs 184 of the user interactions with the interactive visualization 180 associated with a user session. A user session can include the time a user begins to view and/or interact with the interactive visualization 180 till the time the user exits the interactive visualization 180, for example, via closing or exiting the application displaying the interactive visualization 180. The user session analyzer 108 can be configured to analyze data pertaining to one or more user sessions related to one or more interactive visualizations simultaneously. The user's interactions with the interactive visualization 180 can be recorded by the user interaction recorder 182.

The logs 184 from the user interaction recorder 182 are parsed by a log parser 402 to generate a series of tokens. In an example, the logs 184 can also record error messages and the like shown to the user during the operation of the interactive visualization 180. Each token can include a series of characters and grouped characters separated by a delimiter such as a space, a punctuation mark, a carriage return line feed (CRLF) and the like can be identified as discrete tokens. Upon further processing such as filtering and stop word removal, the tokens are analyzed by the presentation evaluator 404. The presentation evaluator 404 can include various criteria to implicitly estimate a satisfaction level of the user with the interactive visualization 180. One method adopted for determining the satisfaction level can include identifying specific user gestures from the tokens using, for example, trained classifiers for particular words. Particular user actions include drilling down to detailed levels, scrolling beyond an existing display, reordering the results using other criteria and the like can be indicative of the user's need for additional information.

The presentation evaluator 404 can also be configured to identify one or more of a group of predefined conclusive user actions such as but not limited to, printing, downloading, sharing via email etc. Of course, it can be appreciated that the interactive visualization 180 is configured with widgets for the user to execute such user actions. If a conclusive user action is identified from the logs 184, it can be determined that the user has attained a measure of satisfaction from the interactive visualization. Accordingly, the interactive visualization 180 can be assigned a particular score. The score can be increased or decreased based on other factors such as, for example, explicit user input. If favorable explicit user input is received the score can be increased and the interactive visualization 180 can be said to have achieved complete user satisfaction. However, if no explicit user input is received or explicit user input requesting additional information is received then the interactive visualization 180 can be said to have achieved a lower level of satisfaction. In an example, an absence of one of the conclusive user actions can be indicative of the user's need for additional information or lower level of satisfaction. Presence of one or more error messages in the logs 184 can also be considered as indicative of the user's need for information or lower level of satisfaction with the interactive visualization 180. AI elements such as neural networks can be used to classify click patterns thereby enabling determination of the user satisfaction with the interactive visualization 180.

Based on the user actions identified from the logs 184, the presentation modifier 406 can be configured to modify the interactive visualization 180 to be responsive to the user's informational need. In an example, the presentation modifier 406 modifies the interactive visualization 180 in real-time as the user view's or interacts with the interactive visualization 180 in response to the user clicking on a link, selecting other options, scrolling or other gestures that are indicative of the user's needs for additional information. In an example, the presentation modifier 406 can present a message to the user that the user will be notified, for example, via email or other modalities when the information the user is seeking becomes available.

Figure 5:
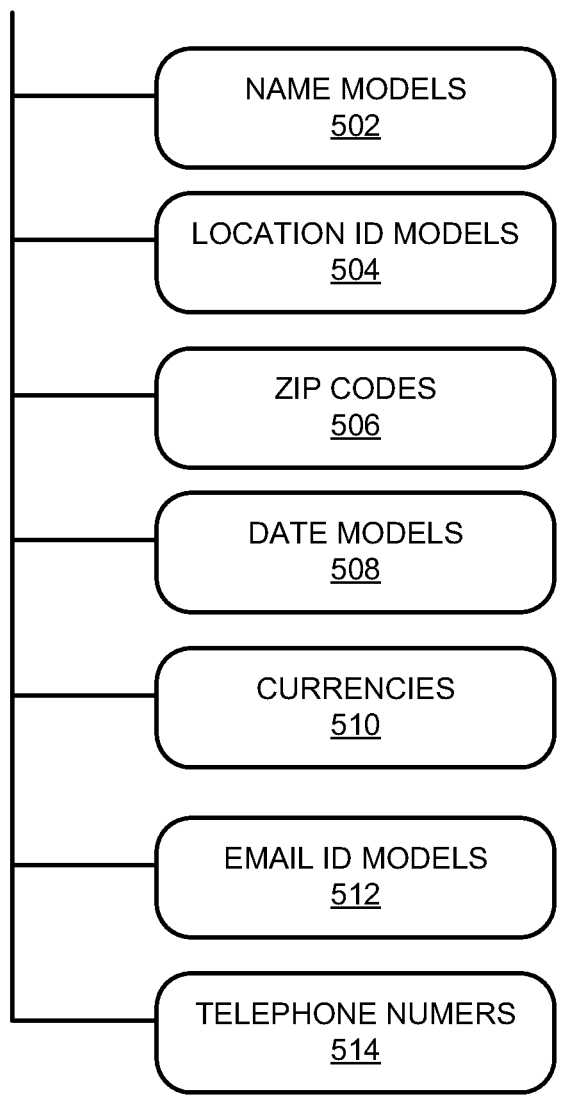
FIG. 5 shows a diagram of trained information extraction (IE) models that can be employed for identifying various entities/search terms in accordance with examples disclosed herein.

FIG. 5 shows a diagram of the trained IE models 208 that can be employed for identifying various entities/search terms from different internal and external data sources such as live internet search results or logs of search results and the like. Trained IE models 208 can include various classifiers that learn to identify various entities/search terms and informational items 114 or entity attributes from the tokens generated by the request processor 1022. The IE models 208 may be trained via supervised learning or unsupervised learning to identify the various entities. Entity name models 502 can be trained to identify various proper nouns occurring in the portions of the historical information 162 or the internet search results. Similarly, classifiers may be used for location id models 504 that can identify geographic locations in terms of latitude and longitudes, zip codes 506 which can identify global locations based on their local zip codes, date models 508 that can identify dates presented in various formats, currencies 510 which identify amounts in various currencies such as dollar amount ids, email id models 512, telephone numbers 514 and the like. It can be appreciated that the list shown in FIG. 5 and described herein is solely for illustration purposes and is not an exhaustive list. As newer interactive visualizations are created and used by the data processing system 100, newer entities may be identified and newer IE models may be trained and included within the data processing system 100 for identification of such entities.

Figure 6:
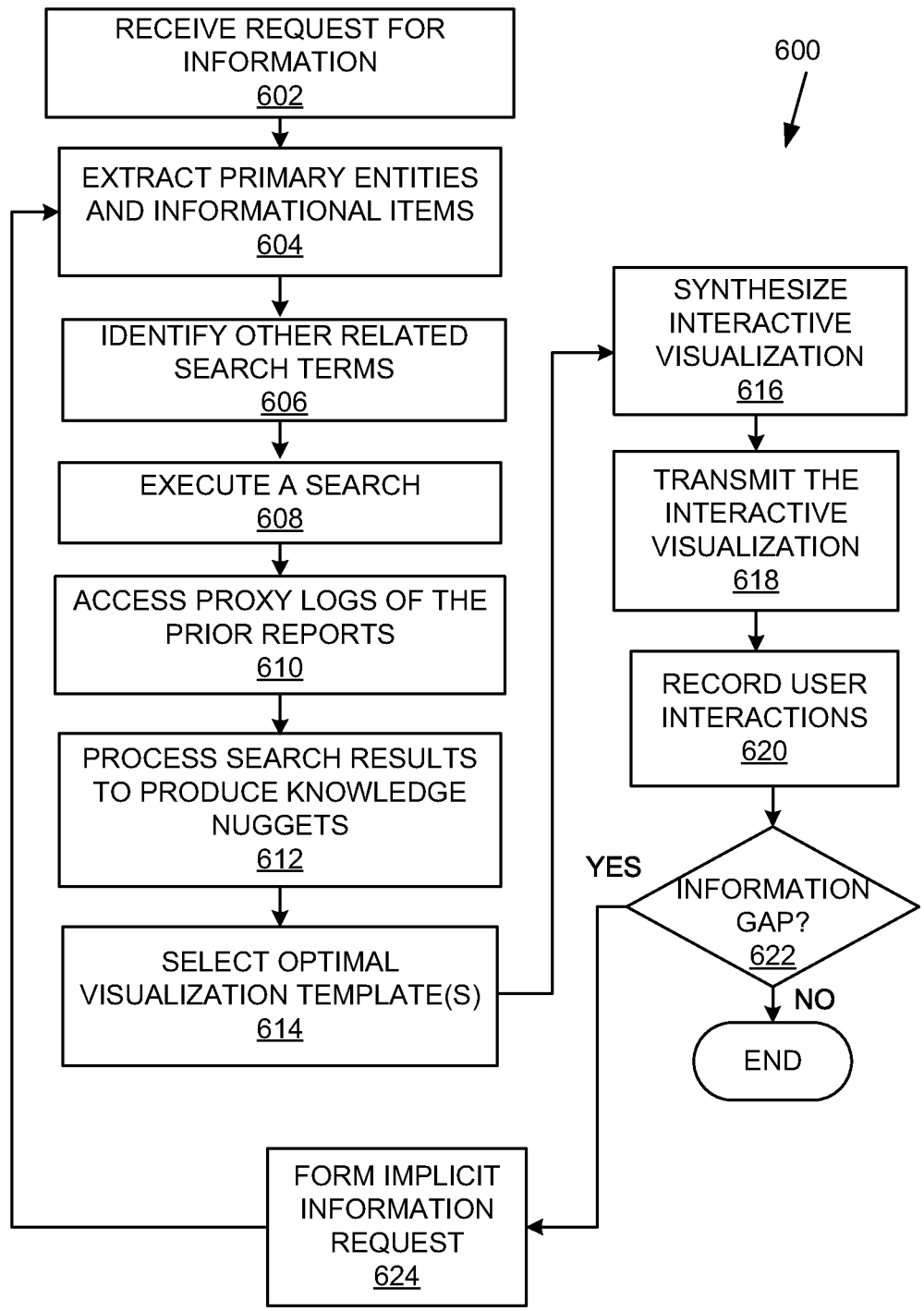
FIG. 6 is a flowchart that details a method of enabling an AI-based data processing in accordance with examples disclosed herein.

FIG. 6 is a flowchart 600 that details a method of enabling an AI-based data processing in accordance with examples disclosed herein. The method begins at 602 wherein the information request 110 is received via one of the various modalities as discussed above. The received information request 110 is processed at 604 as detailed herein based on NLP and the trained IE models 208 to extract the one or more primary entities 112 and the informational items 114. Other related search terms including synonyms, conceptually similar terms, acronyms and related entities are identified at 606 from the knowledge base 160 using one or more of the various similarity measures and scoring techniques thereby expanding the domain for information retrieval. The knowledge base 160 including the historical information 162 can built over time using methodologies such as query expansion, entity sample discovery, identifying entity relationships and entity affinities and the like.

A search for the requested/relevant information is executed at 608 using one or more of the primary entities 112, the informational items 11 and the other related search terms. The other relevant search terms can be used directly as search queries to search one or more of the knowledge base 160 and the internet 170. Additionally, search queries can be manually or automatically framed using the other relevant search terms. For example, a prior search query with similar informational items but a different primary entity may have been identified from the knowledge base.

The auto query generator 222 can automatically generate a newer relevant query by substituting terms within the prior query with one or more of the primary entity 112, the informational items 114 and the auxiliary search terms. The determination regarding the substitution can be made based on identification of context within the query by employing POS tags and/or N-gram analysis. In addition substitution of terms can be made based on determined similarities between the terms being replaced and the primary entity 112, the informational items 114 and the auxiliary search terms.

The information requested within the information request 110 and/or relevant to the information request 110 is extracted at 610 from the search results including one or more of documents retrieved during the search using the trained IE models 208 and the rules 164 in the knowledge base 160. The information is extracted in the form of the knowledge nuggets 260 which include one or more dataset(s) responsive to the information request 110. The datasets can vary in size from a single character to large multi-dimensional data capable of being presented in various presentation formats. Based on the formats in which the datasets are retrieved, the search results can be further processed at 612 to form the knowledge nuggets. For example, if the data responsive to the information request is retrieved from a scanned document which is not machine-readable, then such document may be parsed and further processed using AI techniques such as NLP and optical character recognition (OCR) to generate tokens of machine-readable data thereby digitizing the dataset or transforming the dataset into machine-readable format. Furthermore the inter-relations between the various tokens are also preserved as nodes and edges within the knowledge graphs of the knowledge base 160 so that the appropriate rendering format can be selected for the dataset(s). In an example, there can be a one-to-one correspondence between the retrieved dataset(s) and the knowledge nuggets 260. In an example, multiple datasets can be grouped together as a knowledge nugget.

The optimal visualization template for the knowledge nuggets 260 is selected at 614 from the visualization templates 166 from the knowledge base 160 as detailed herein. The interactive visualization 180 including the knowledge nuggets 260 is automatically synthesized at 616, for example, as a web document or a navigable website using the selected visualization template 354. In an example, more than one visualization template can be selected and user-selectable optional visualizations can also be provided. The visualization templates 166 can be constructed from scripting tools such as but not limited to HTML, CSS, Java Script and the like and the datasets within the knowledge nuggets 260 can be incorporated into the visualization templates via processes such as string substitutions. The selected visualization template with the knowledge nuggets 260 included can be further customized to include one or more interaction points 356 that enable providing the user with any additional information and determining the user satisfaction with the interactive visualization 180. In an example, each piece of data corresponding to one or more entities with defined attributes within the knowledge base 160 can be coupled with the interaction points 356 or user interface (UI) elements on the visualization templates can be coupled to the interaction points 356. Widgets such as links can be coupled to the designated interaction points to encourage user interaction. In an example, standard interaction points such as buttons for printing, sharing, downloading etc. can be included in the visualization templates 166 so that they are automatically included with interactive visualizations that are generated therefrom. Furthermore the interactive visualization 180 can be further configured to include or to be communicatively coupled to a user interaction recorder 182.

The interactive visualization 180 thus synthesized is communicated to the user at 618, for example, via transmitting a link to the navigable website via one or more of an email, a small message service (SMS), social media applications and the like. The user's interactions with the interactive visualization 180 are recorded at 620 and employed at 622 to determine if an information gap exists between the information presented by the interactive visualization 180 and the information request 110 or if the user desires additional information on viewing the interactive visualization 180. If it is determined at 622 that the information gap exists or that the user desires further information, the process moves to 624 wherein a new information request can be implicitly framed from the user interactions. The implicitly framed request can be a combination of a user action which is not a conclusive user action and additional search terms based on the information gap such as one or more new entity names. For example, the user may have clicked on an entity name with a link or the user may try to scroll beyond what is displayed on the user's screen or the user can execute an explicit search for particular entities via a search box if available. In such cases, the user's actions can give rise to the implicit information request. On receiving the implicit information request, the method returns to 604 wherein the implicit information request is processed to retrieve relevant information such as the new entity names. The steps 606 through 620 are repeated and the retrieved relevant information is presented to the user in an optimal interactive visualization obtained by the repetition of the steps 606 through 620. If at 622, it is determined that the user is satisfied with the interactive visualization 180, then the method terminates on the end block. As mentioned earlier, the user can convey satisfaction with the interactive visualization 180 either via explicit feedback or via implicit feedback by executing one or more of the conclusive user interactions.

Figure 7:
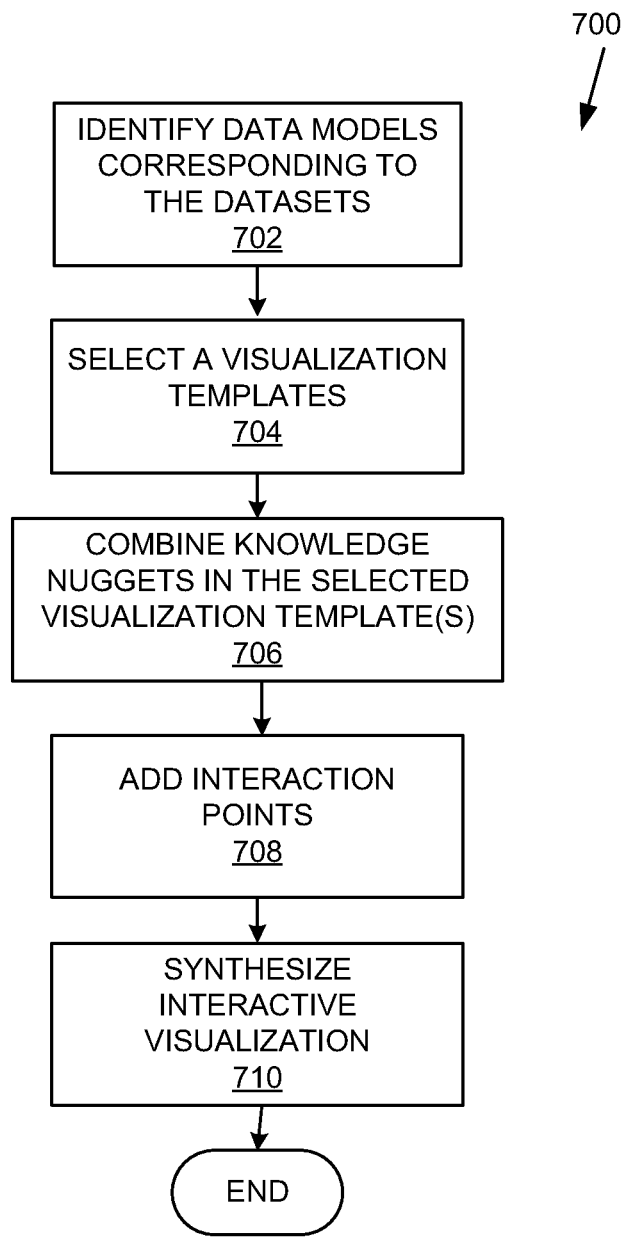
FIG. 7 illustrates a flowchart that details a method of synthesizing the interactive visualization in accordance with examples disclosed herein.

FIG. 7 illustrates a flowchart 700 that details a method of synthesizing the interactive visualization 180 in accordance with examples disclosed herein. The method begins at 702 wherein data models 352 such as the IE models for the datasets within the knowledge nuggets 260 are identified. At 704, the visualization classifiers 342 which are trained based on the data models 352 using, for example, supervised learning with labelled data can be employed for automatic selection of one or more of the visualization templates at 704. In an example, the knowledge base 160 can include predetermined ranks indicative of the suitability of each of the visualization templates 166 for various types of datasets/data models 352. If more than one visualization template is selected, then the templates can be ordered using the predetermined ranks and the top N-ranked templates (N being a natural number) can be selected at 704 for generating one or more corresponding interactive visualizations. The knowledge nuggets 260 are combined with each of the selected visualization templates at 706. In an example, the visualization templates include documents including markup such as webpages. The datasets from the knowledge nuggets 260 can be automatically plugged into the markup via NLP techniques such as, for example, string substitution.

The interaction points 356 are included in each of the selected visualization templates at 710. As the visualization templates include documents with markup such as web pages the interaction points to be pre-defined for each visualization template and/or based on the nature of information to be included within the interactive visualization 180. The interaction points 356 can therefore include, those which are unique to a given visualization template, the interaction points unique to the data elements within the knowledge nuggets and those which are common across the visualization templates 166. For example, if a visualization template includes animated presentation of a dataset then a button or other widget to pause or replay the animation can be included for that visualization template. In another example, each of the primary entities 112 or other related entities can be configured as links so that when a user clicks on the link, a search of one or more of the knowledge base 160 and the internet 170 is executed with the entity name as a search query. In yet another example, more focused results pertaining to the entity clicked on by the user may be retrieved from the knowledge base 160. Other interaction points can include links to other interactive visualizations or buttons for executing conclusive actions and the like. The interaction points 356 can be incorporated within the interactive visualization 180 by modifying the markup of the visualization templates to include scripts or code modules corresponding to the interaction points 356. The interactive visualization 180 is thus synthesized at 710 for presentation of the knowledge nuggets 260 to the user.

Figure 8:
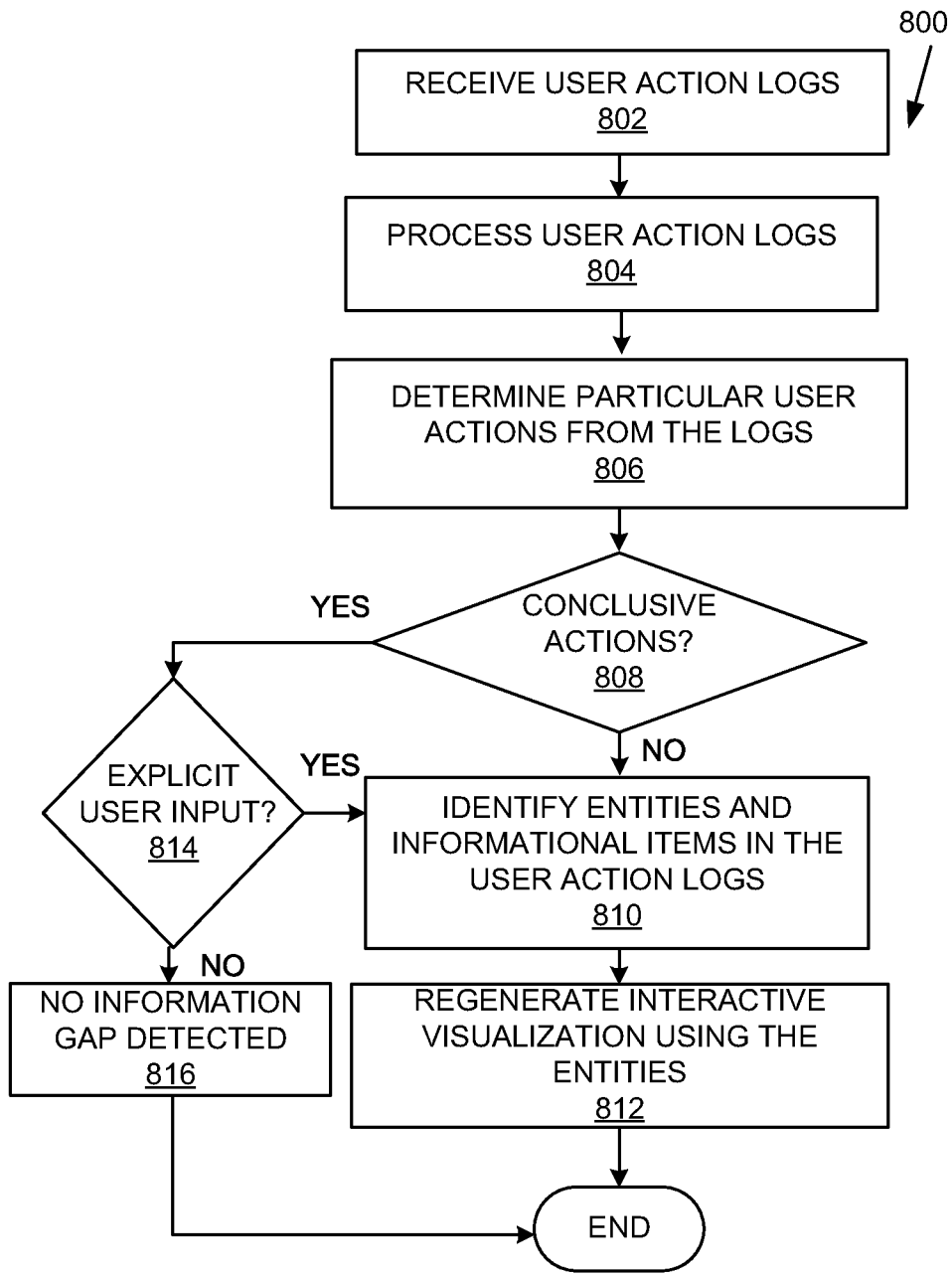
FIG. 8 shows a flowchart that details a method of identifying an information gap based on the user actions in accordance with examples disclosed herein.

FIG. 8 shows a flowchart 800 that details a method of determining if an information gap exists based on the user actions. The method begins at 802 wherein the data processing system 100 accesses the logs 184 of the user actions from the user interaction recorder 182. The logs 184 are processed by parsing, removing stop words and tokenized at 804. At 806, the particular actions executed by the user are determined. For example, trained classifiers for identification of particular keywords indicative of user actions can be employed to determine the actions that were executed by the user. It is determined at 808 if any of the actions were conclusive actions such as printing the information, downloading documents associated with the interactive visualization (such as a document format of the information presented therein), sharing the interactive visualization with other users and the like.

If it is determined at 808 that a conclusive action was executed, then it is further determined at 814 if there was any explicit user input requesting information. If it is determined at 814 that no explicit user input is received, then it can be concluded that the user was satisfied with the interactive visualization 180 and hence no information gap is detected at 816. The method therefore terminates on the end block. If it is determined at 814 that explicit user input is received, the method proceeds to 810 to determine the entities and informational items in the user action logs so that the interactive visualization is regenerated at 812 per the informational need identified via the user actions. Similarly if it is determined at 808 that a conclusive action was not executed, the method proceeds to 810 to determine the entities and informational items in the user action logs so that the interactive visualization is regenerated at 812 per the informational need identified via the user actions and the method therefore terminates on the end block.

Figure 9:
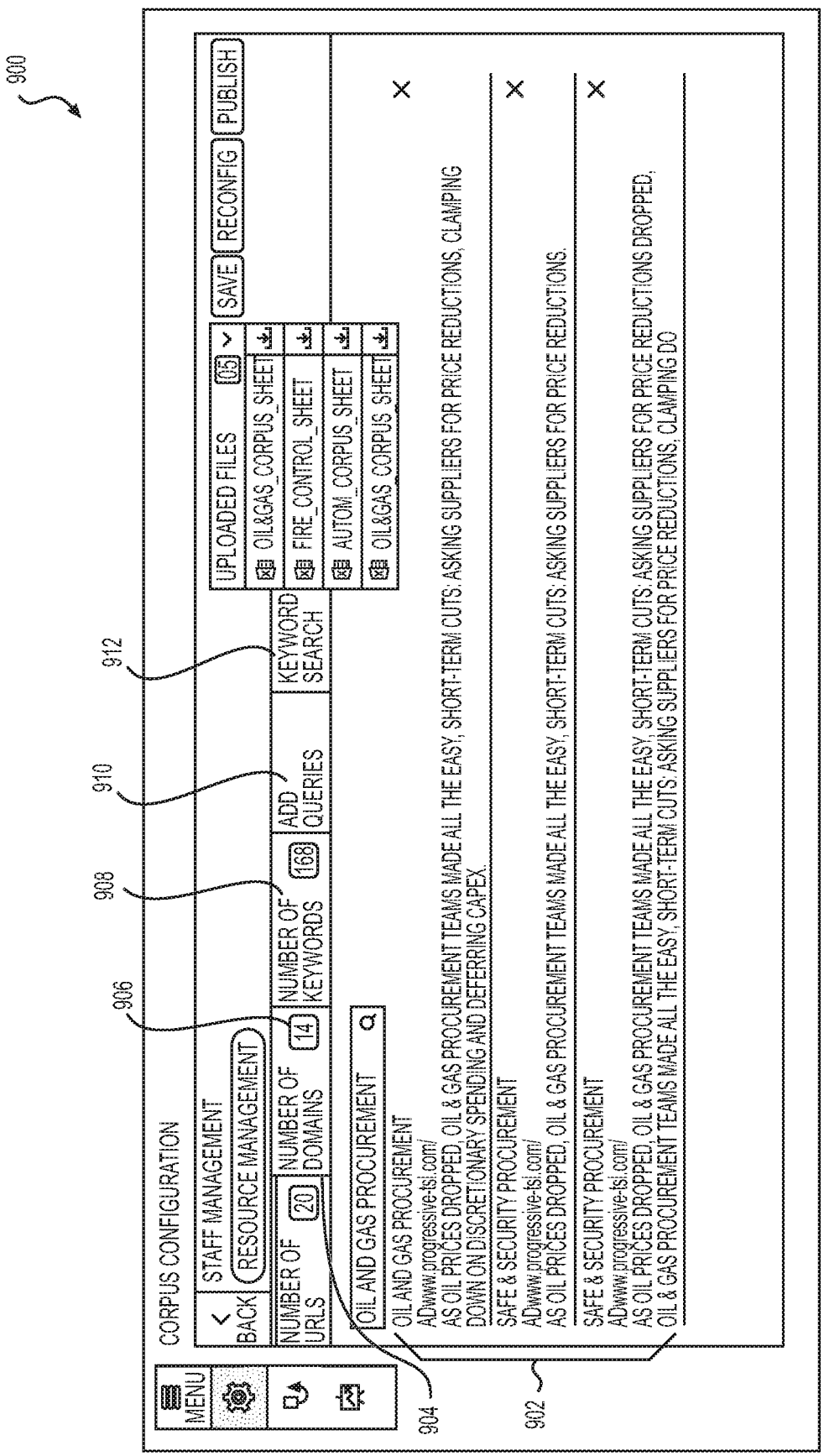
FIG. 9 shows a configuration screen that enables user interaction with the data processing system in accordance with examples disclosed herein.

FIG. 9 shows a configuration screen 900 that enables user interaction with the data processing system 100. Search results 902 obtained upon conducting a search related to the oil industry are displayed. The search results 902 can be retrieved from one or more of the knowledge base 160 and the internet 170 and snippets including the first few sentences or summary of the corresponding document are displayed with the search results 902. The configuration screen 900 further includes tabs for the number of Universal Resource Locators (URLs) 904, the number of domains in the knowledge base 160 906 and the number of keywords 908 which were determined to be relevant to the search query. In addition, tabs to add queries 910 and to execute explicit keyword searches 912 by the users are also included. It may be noted that user interactions with these various tabs can convey the user's need for information or enable the data processing system 100 to determine an information gap.

Figure 10:
FIG. 10 shows an interactive visualization that was generated for a two dimensional data set in accordance with some examples disclosed herein.

FIG. 10 shows an interactive visualization 1000 that was generated for a two dimensional data set. The data processing system 100 selected the interactive visualization 1000 from the multiple visualization templates that are possible for the two dimensional data set as shown in FIG. 10.

Figure 11:
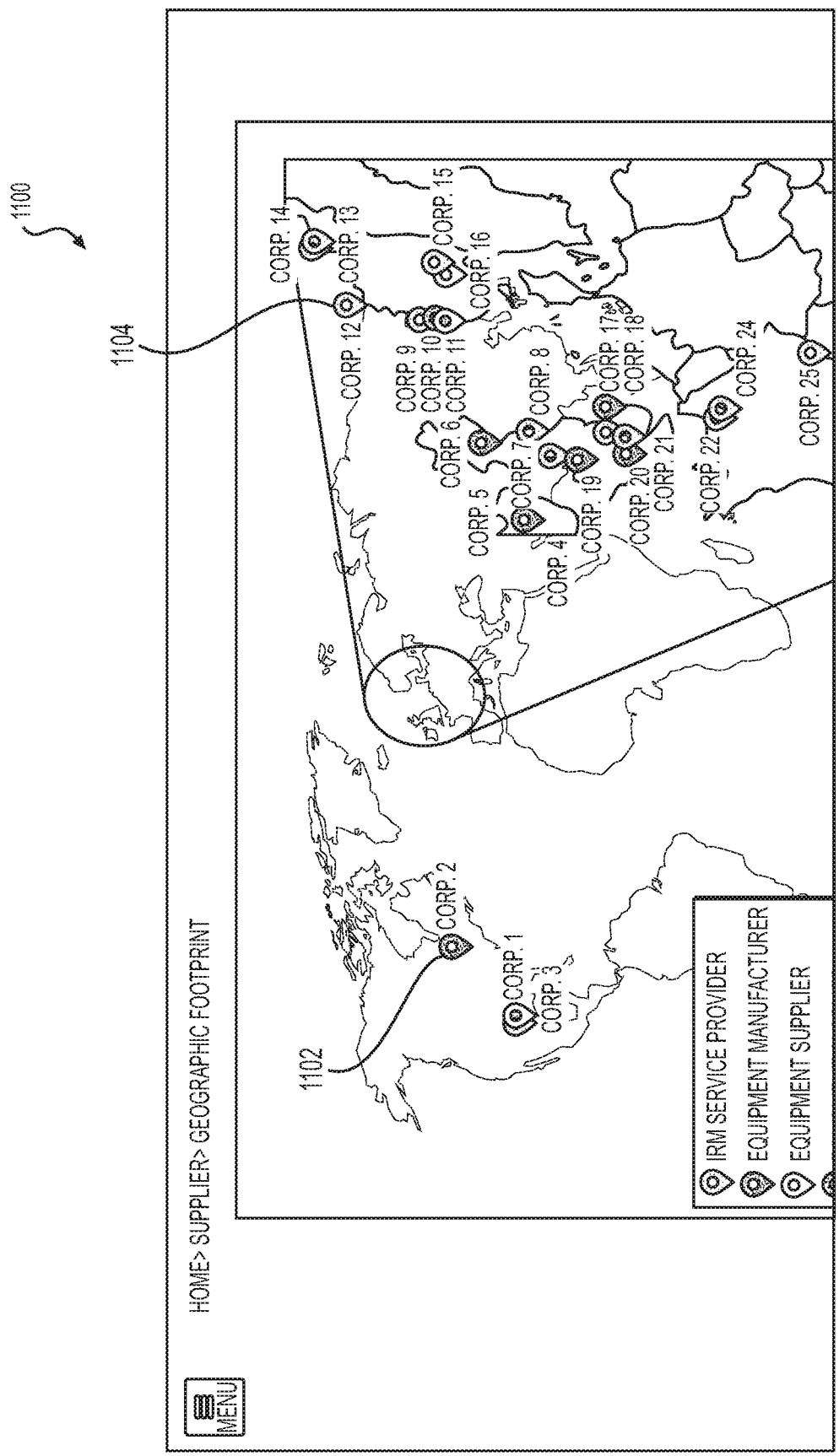
FIG. 11 shows another interactive visualization for displaying geographic data in accordance with some examples disclosed herein.

FIG. 11 shows another interactive visualization 1100 for displaying geographic data in accordance with some examples. The interactive visualization 1100 can include interaction points 1102, 1104 etc. Selection of one or more of the interaction points 1102, 1104 etc. enables data processing system 100 to automatically generate a new query with entities and/or informational items associated with the selected interaction point. A different interactive visualization including the datasets obtained by executing the new query on one or more of the knowledge base 160 and the internet 170 can be displayed.

Figure 12:
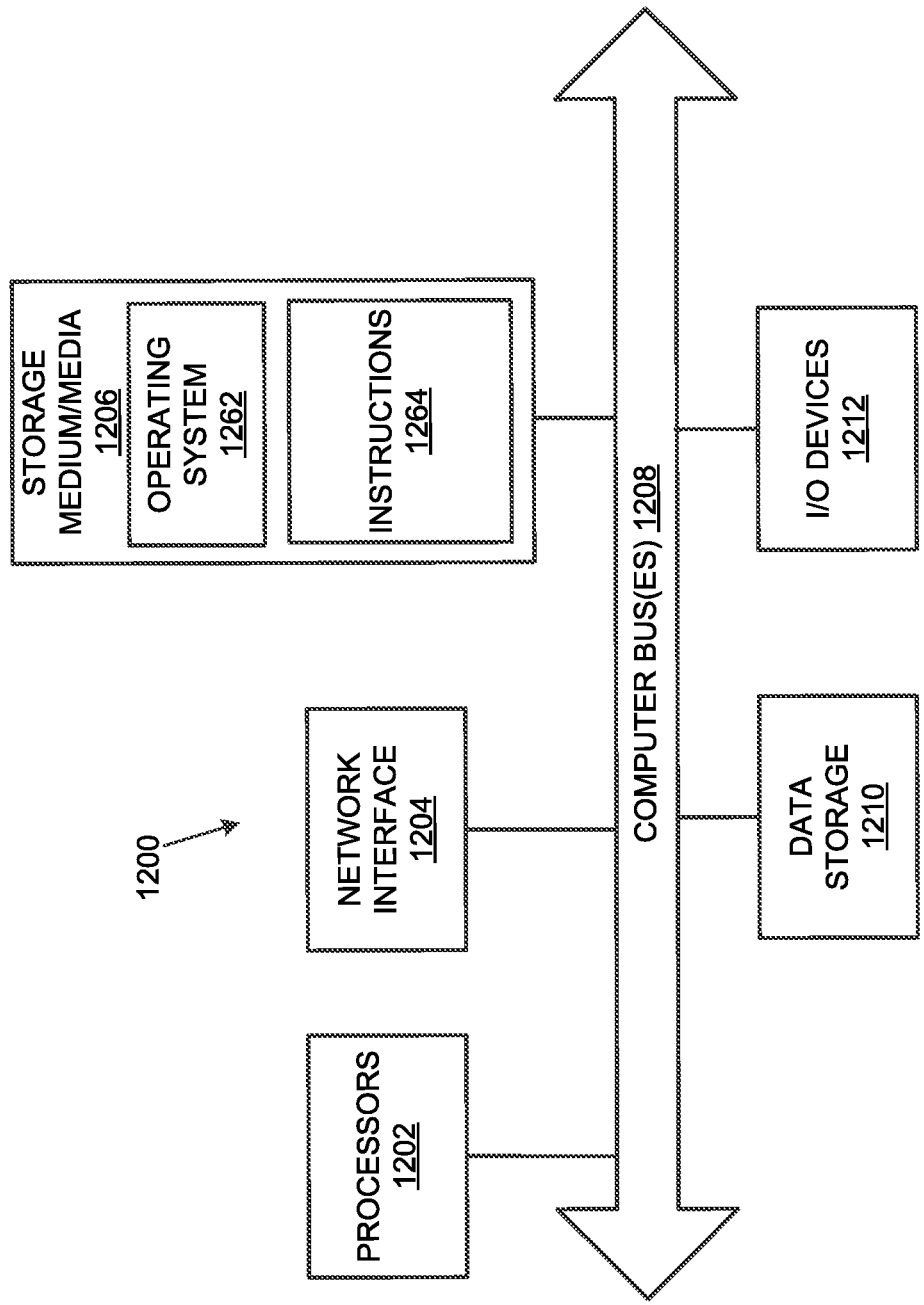
FIG. 12 illustrates a computer system that may be used to implement the data processing system.

FIG. 12 illustrates a computer system 1200 that may be used to implement the data processing system 100. More particularly, computing machines such as desktops, laptops, smartphones, tablets, wearables which may be used to generate or access the data from the data processing system 100 can have the structure of the computer system 1200. The computer system 1200 may include additional components not shown and some of the components described may be removed and/or modified. In another example, a computer system 1200 can sit on external-cloud platforms such as, Amazon Web Services, or internal corporate cloud computing clusters, or organizational computing resources, etc.

The computer system 1200 includes processor(s) 1202, such as a central processing unit, ASIC or other type of processing circuit, input/output devices 1212, such as a display, mouse keyboard, etc., a network interface 1204, such as a Local Area Network (LAN), a wireless 802.11x LAN, a 3G or 4G mobile WAN or a WiMax WAN, and a computer-readable medium 1206. Each of these components may be operatively coupled to a bus 1208. The computer-readable medium 1206 may be any suitable medium which participates in providing instructions to the processor(s) 1202 for execution. For example, the computer-readable medium 1206 may be non-transitory or non-volatile medium, such as a magnetic disk or solid-state non-volatile memory or volatile medium such as RAM. The instructions or modules stored on the computer-readable medium 1206 may include machine-readable instructions 1264 executed by the processor(s) 1202 to perform the methods and functions of the data processing system 100.

The data processing system 100 may be implemented as software stored on a non-transitory computer-readable medium and executed by the one or more processors 1202. For example, the computer-readable medium 1206 may store an operating system 1262, such as MAC OS, MS WINDOWS, UNIX, or LINUX, and code 1264 for the data processing system 100. The operating system 1262 may be multi-user, multiprocessing, multitasking, multithreading, real-time and the like. For example, during runtime, the operating system 1262 is running and the code for the data processing system 100 is executed by the processor(s) 1202.

The computer system 1200 may include a data storage or non-transitory computer readable storage medium 1210, which may include non-volatile data storage. The data storage 1210 stores data used by the data processing system 100. The data storage 1210 may be used to store the knowledge nuggets 260, the trained IE models 208 and the like.

The network interface 1204 connects the computer system 1200 to internal systems for example, via a LAN. Also, the network interface 1204 may connect the computer system 1200 to the Internet. For example, the computer system 1200 may connect to web browsers and other external applications and systems via the network interface 1204.

What has been described and illustrated herein is an example along with some of its variations. The terms, descriptions and figures used herein are set forth by way of illustration only and are not meant as limitations. Many variations are possible within the spirit and scope of the subject matter, which is intended to be defined by the following claims and their equivalents.

What is claimed is:

1. An artificial-intelligence-based document processing system comprising:
    at least one processor;
    at least one non-transitory computer readable medium storing machine-readable instructions that cause the at least one processor to:
    receive a request for information, the request for information including one or more primary entities and informational items;
    extract the primary entities from the request using at least named entity recognition (NER);
    obtain one or more search terms related to the primary entities from at least a knowledge base and internet by employing trained machine learning (ML) models in conjunction with N-gram analysis;
    identify relevant documents from one or more of the internet and the knowledge base using one or more of the search terms, the primary entities and the informational items;
    extract data responsive to the request as one or more knowledge nuggets from the relevant documents using trained information extraction (IE) models and rules from the knowledge base;
    automatically select at least one visualization template for generating an interactive visualization of the extracted data, the visualization template being selected from a collection of visualization templates;
    generate the interactive visualization by incorporating at least the knowledge nuggets within the selected visualization template;
    receive one or more recorded user actions executed via the interactive visualization;
    determine an information gap associated with the interactive visualization based on a mapping of the recorded user actions to particular intents; and
    update the interactive visualization in response to the determination of the information gap and in accordance with the mapping, wherein updating the interactive visualization includes:
        obtaining additional search terms based on the information gap; and
        based on the additional search terms,
        repeating the steps of identifying the relevant documents, extracting the data, automatically selecting the at least one visualization template, generating the interactive visualization and receiving the recorded user actions.

2. The document processing system of claim 1, wherein the instructions for obtaining the search terms related to the primary entities further comprise instructions that cause the processor to:
  execute one or more entity queries on the knowledge base and the internet using the primary entities as search terms for the one or more entity queries.

3. The document processing system of claim 2, wherein the instructions for obtaining the search terms related to the primary entities further comprise instructions that cause the processor to:
  select candidate search terms from results obtained on executing the entity queries on the knowledge base and the internet, wherein the results that match part-of-speech tagging of the primary entities are selected as the candidate search terms; and
  select the search terms from the candidate search terms based on a match between the primary entities and the candidate search terms.

4. The document processing system of claim 3, wherein the instructions for selecting the search terms based on the match further comprise instructions that cause the processor to:
  calculate similarities of words before and after the primary entities in the request with words before and after the candidate search terms in the results;
  rank the candidate search terms based on the similarities; and
  select as the search terms, the candidate search terms that have highest similarities.

5. The document processing system of claim 1, wherein instructions for extracting information responsive to the request from the relevant documents further comprise instructions that cause the processor to:
  identify the knowledge nuggets from the relevant documents by using the trained IE models, the knowledge nuggets including datasets responsive to the request, the knowledge nuggets modeled as key-value pairs associated with at least the primary entities.

6. The document processing system of claim 5, further including instructions that cause the processor to:
  add to the knowledge base, a subset of the knowledge nuggets identified from a subset of the relevant documents obtained from the internet.

7. The document processing system of claim 5, wherein instructions for automatically selecting at least one visualization for presentation further comprise instructions that cause the processor to:
  determine IE models for datasets within the knowledge nuggets, the IE models based on properties of the datasets including one or more of a depth of nesting, a number of pairs, data format and data type.

8. The document processing system of claim 7, wherein instructions for automatically selecting the visualization template further comprise instructions that cause the processor to:
  employ a visualization classifier for selecting the visualization template based at least on data models of the datasets within the knowledge nuggets.

9. The document processing system of claim 1, wherein the instructions for automatically selecting the visualization template further comprise instructions that cause the processor to:
  provide within the interactive visualization, one or more of additional visualizations generated from the visualization templates for the knowledge nuggets as user-selectable optional visualizations.

10. The document processing system of claim 9, wherein the instructions for automatically selecting the visualization template further comprise instructions that cause the processor to:
  include datasets from the knowledge nuggets within the user-selectable optional visualizations.

11. The document processing system of claim 1, wherein instructions for generating the interactive visualization further comprise instructions that cause the processor to:
  couple one or more interaction points with at least one of a user interface element or a data element within the interactive visualization.

12. The document processing system of claim 1, wherein the instructions for determining the information gap associated with the selected visualization include instructions that cause the processor to:
  analyze interaction patterns of a user with the interactive visualization; and
  identify particular ones of the recorded user actions that are indicative of the user's need for additional information.

13. A method of processing an interactive document comprising:
  enabling presentation of an interactive visualization to a user, the interactive visualization including knowledge nuggets regarding one or more primary entities that are extracted from an information request;
  receiving logs of one or more recorded user interactions with the interactive visualization;
  identifying the one or more recorded user interactions with the interactive visualization via natural language processing of the logs;
  identifying an information gap corresponding to one or more of the primary entities within the interactive visualization presented to the user based on absence of predetermined conclusive user actions from the one or more recorded user interactions;
  extracting one or more auxiliary entities from the logs of the one or more recorded user interactions using named entity recognition techniques;
  obtaining one or more search terms related to the auxiliary entities from at least a knowledge base and internet by employing trained information extraction (IE) models;
  identifying relevant documents from one or more of the internet and the knowledge base using one or more of the search terms, the primary entity and the auxiliary entities;
  extracting datasets responsive to the information gap from the relevant documents using the trained IE models and rules from the knowledge base; and
  automatically updating the interactive visualization using the extracted datasets.

14. The method of claim 13, wherein determining that an information gap exists in the interactive visualization further comprises:
  parsing the logs; and
  determining that the logs do not include keywords pertaining to the predetermined conclusive user actions.

15. The method of claim 13, wherein determining that the information gap exists in the interactive visualization further comprises:
  determining that the logs include keywords indicative of the predetermined conclusive user actions in conjunction with the one or more auxiliary entities.

16. The method of claim 13, wherein automatically updating the interactive visualization further comprises:

selecting by visualization classifiers from a collection of visualization templates, a visualization template for displaying datasets responsive to the information gap; and providing a display of the datasets responsive to the information gap within the selected visualization template.

17. The method of claim 16, wherein automatically updating the interactive visualization further comprises:
including at least one interaction point within the selected visualization template.

18. The method of claim 13, further comprising:
employing the auxiliary entities in conjunction with the primary entities as training data.

19. A non-transitory computer-readable storage medium comprising machine-readable instructions that cause a processor to:
receive a request for information, the request for information including one or more primary entities;
extract the primary entities from the request using at least named entity recognition (NER);
obtain one or more search terms related to the primary entities from at least a knowledge base and internet by employing trained machine learning (ML) models in conjunction with N-gram analysis;
identify relevant documents from one or more of the internet and the knowledge base using one or more of the search terms and the primary entities;
extract data responsive to the request as one or more knowledge nuggets from the relevant documents using trained information extraction (IE) models and rules from the knowledge base;
automatically select at least one visualization template for generating an interactive visualization of the extracted data, the visualization template being selected from a collection of visualization templates;
generate the interactive visualization by incorporating at least the knowledge nuggets within the selected visualization template;
receive one or more recorded user actions executed via the interactive visualization;
determine an information gap associated with the interactive visualization based on a mapping of the recorded user actions to particular intents; and
update the interactive visualization in response to the determination of the information gap and in accordance with the mapping, wherein updating the interactive visualization includes:
obtaining additional search terms based on the information gap; and
based on the additional search terms,
repeating the steps of identifying the relevant documents, extracting the data, automatically selecting the at least one visualization template, generating the interactive visualization and receiving the recorded user actions.

20. The non-transitory computer-readable storage medium of claim 19, wherein instructions for receiving the recorded user actions further comprise machine-readable instructions that cause the processor to:
receive the recorded user actions executed via at least one interaction point included within the interactive visualization.

* * * * *